Sept. 12, 1944. H. F. WILLKIE 2,358,272
ART OF DISTILLING SPIRITUOUS LIQUORS
Filed Feb. 11, 1942
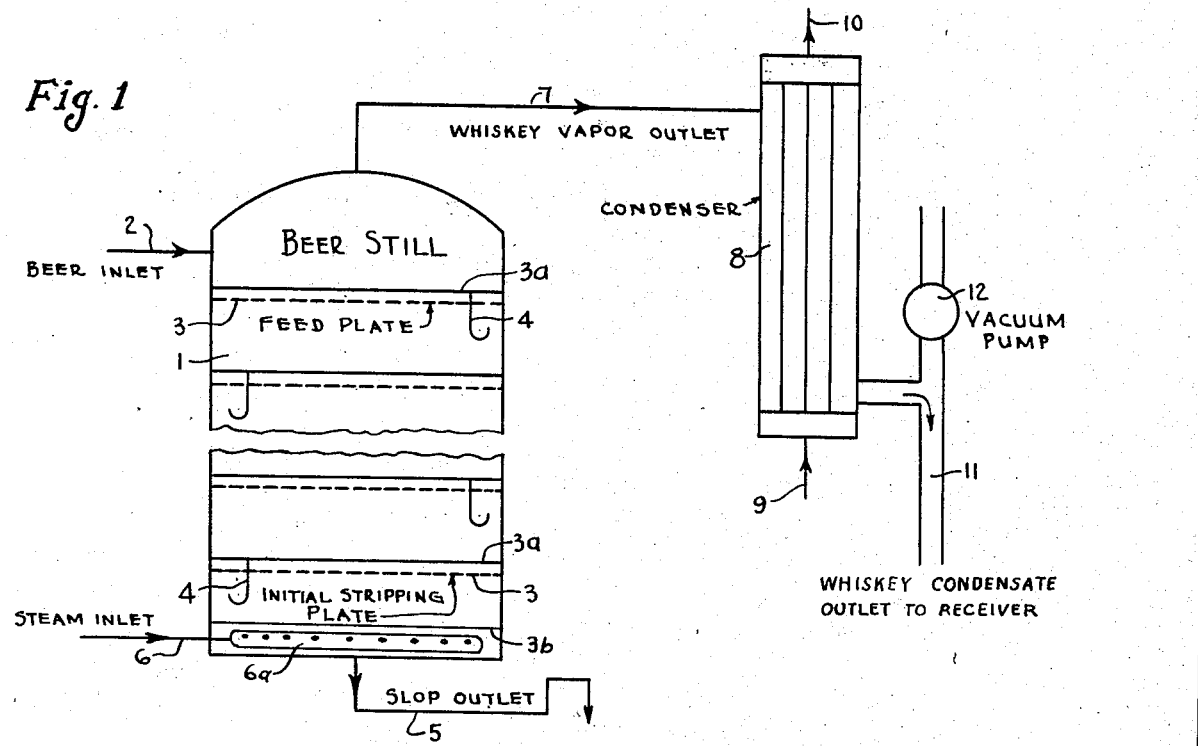
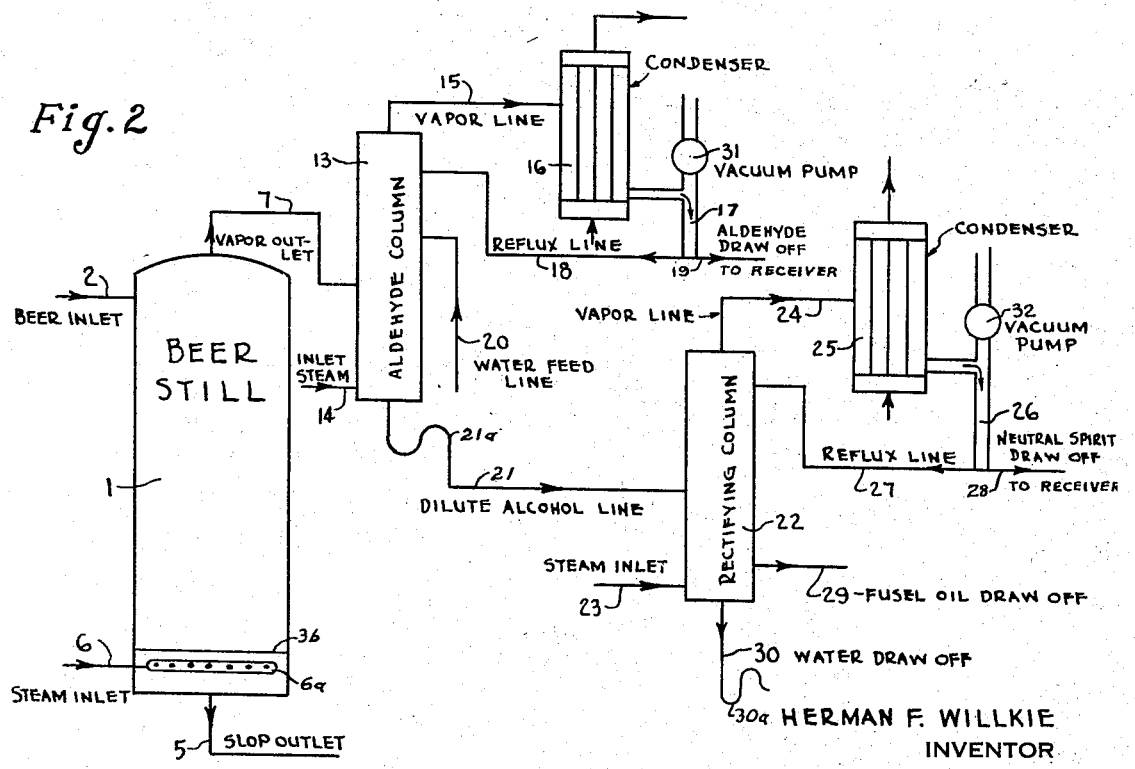
HERMAN F. WILLKIE
INVENTOR
BY Arthur H. Robert
ATTORNEY Patented Sept. 12, 1944

2,358,272

UNITED STATES PATENT OFFICE 2,358,272

ART OF DISTILLING SPIRITUOUS LIQUORS

Herman F. Willkie, Prospect, Ky., assignor to Joseph E. Seagram & Sons, Inc., Shively, Ky., a corporation of Indiana Application February 11, 1942, Serial No. 430,475

5 Claims. (Cl. 202—46)

This invention relates to improvements in the art of distilling spirituous liquors. While the invention is applicable to the distillation of spirituous liquors from distiller's beer, using that term generically to include wine must, beer wort, whiskey mash or berry extract, the explanation of the invention immediately following, for the purpose of illustration, is limited to whiskey, or more particularly, to the treatment of the particular type of distiller's beer from which whiskey is made. The term "distiller's beer," as used herein, should not be confused with "beverage beer." Both of these beers are distilled to remove alcohol from the beer residue, but with distiller's beer, the alcohol is the primary product, the distillation being for the purpose of recovering the entire alcoholic content of the beer as a quality product leaving the beer residue as a waste product substantially free of alcohol, whereas, with beverage beer, the residue beer is the primary product, the distillation being for the purpose of removing some of the alcoholic content of the beer residue without deleteriously affecting the beverage quality of that residue.

At the present time, two whiskey distilling processes are largely employed, namely the batch process and the continuous process. In the batch process, a large body of distiller's beer is placed in a batch or charge still and stripped of its alcohol and other volatile components by steam which is introduced at the bottom of the still to pass upwardly throughout the full depth of the batch, causing the beer to boil. Due, among other things, to the difficulty of maintaining accurate control of stripping conditions, charge still whiskies, while chemically similar, are not uniform.

The continuous process was developed to reduce stripping time and steam consumption, increase capacity, and provide more accurate control of stripping conditions to the end of securing a more uniform product. In it, a stream of distiller's beer is continually fed to the top of a fractionating tower or column, (having a superimposed series of vertically spaced perforated plates wherein it forms on the top perforated plate a shallow bath of uniform depth, usually about two inches, from which it continually over-flows through a downpipe to form a similar bath on the next plate, this action repeating itself throughout the depth of the column) and stripped of its alcohol and other volatile components by steam which is introduced at the bottom of the column to pass upwardly through the perforations of successive plates, causing the bath on each plate to boil. Since accurate control is maintained, continuous still whiskies are both chemically similar and uniform.

Continuous still whiskey was not originally intended to differ from charge still whiskey in any respect, except uniformity. As a matter of fact, both are so chemically alike that it is not yet possible to determine any significant chemical difference between them. Nevertheless they differ widely in body, odor, and taste, charge still whiskies being definitely "heavy," and continuous still whiskies definitely "light," in these respects.

Since the lighter whiskies are considered correspondingly freer of so-called "impurities," it is desirable to produce still lighter whiskies, and such forms the principal object of this invention.

The factors responsible for the differences noted between charge and continuous still whiskies are not apparent. For example, the temperature of the beer in the stripping operation has not appeared to be a factor since the maximum temperature at the bottom of the charge still approaches 222° F. while that of the continuous still is only 7° F. lower. I have discovered, however, that temperature is an important factor, and that the "lightness" of a continuous still product will increase as the maximum temperature of distiller's beer is reduced, the "lightness" being measurably increased when maximum boiling temperatures are held below 187° F. and the temperature of the beer, prior to its entry into the still, and in the still is not allowed to exceed such boiling temperatures.

An important object of the invention is, therefore, to conduct the strpiping operation of distiller's beer in a continuous distilling column at reduced boiling temperatures and under conditions such that the temperature of the beer in the column and prior to its entry into the column never rises above said boiling temperatures.

I have also found that, in connection with the distillation of neutral spirits, the invention may be advantageously applied not only to the continuous beer distilling column but to either or both the aldehyde and rectifying columns, and such forms another object of the invention.

The invention is illustrated in the accompanying drawing wherein:

Figure 1 is a schematic diagram of a continuous whiskey still arrangement which may be operated in accordance with the invention; and Figure 2 is a similar diagram of a continuous arrangement for the manufacture of neutral spirits which may be operated in accordance with the invention.

The arrangement shown in Figure 1 comprises a beer still or fractionating column 1 having a top beer inlet 2; a series of vertically-spaced horizontally-arranged perforated plates 3; a down-pipe 4 for each plate, each pipe extending from the upper level of the liquid on the corresponding plate, indicated at 3a, downwardly through the plate; a bottom slop outlet 5 connected to a suitable liquid seal; a bottom steam inlet 6, connected to a suitable distributing means such as a sparge pipe 6a; and a top whiskey (commonly called high wine) vapor outlet 7; and a condenser 8 having inlet and outlet connections 9 and 10 for a cooling medium and a whiskey condensate outlet 11 leading to a suitable receiver.

A liquid bath indicated at 3b is normally maintained in the bottom of the still of sufficient depth to cover the sparge pipe 6a. The initial stripping occurs in this bath which is the first portion of the liquid contacted by the steam.

In the normal operation of this arrangement, distiller's beer is fed into the top of the column through beer inlet 2. The beer flows across the feed plate, i. e., the uppermost perforated plate 3, assuming a level, usually 2", determined by the upper end of down-pipe 4, the overflow passing through the down-pipe onto the next perforated plate 3. This action repeats itself downwardly through the still, the beer ultimately being discharged from outlet 5 in form of alcohol-free slop. As operated heretofore, the temperature of the slop ordinarily approximates 215° F. Steam is admitted to the bottom of the still through sparge pipe 6a. This steam heats the initial bath of liquid at the bottom of the column around the sparge pipe and causes it to boil. The steam and volatile vapors leave this boiling liquid at the bottom of the column and pass through the perforations of the plate next above and upwardly through the bath on the plate. This action is repeated upwardly through the column.

It is important to understand that since the liquid is boiling on each plate and in the bath at the bottom of the column, the vapor and liquid are in equilibrium with one another at these several points. In other words, there is an exchange of material between the liquid and vapor wherein, for example, a mol of the less volatile material condenses out of the vapor and gives up its latent heat which, in turn, causes a certain amount, a mol if the latent heats are similar, of the more volatile material to distill out of the liquid and into the vapor. The ultimate beer distillate or vapor produced at the top of the still passes through the whiskey vapor outlet 7 into condenser 8 where it is cooled and condensed by the flow of cooling medium between inlet and outlet connections 9 and 10. The whiskey condensate passes out of the condenser through the outlet 11 to a suitable receiver.

In accordance with my invention, the beer still is placed under a high degree of vacuum, the higher the better. Ordinarily, good results can be obtained with a vacuum at the top of the still ranging above 16" Hg. For all practical purposes, 20" to 28½" Hg. can be readily maintained with proper column design. In order to maintain the vacuum, a vacuum jet, pump or other suitable device may be employed, a vacuum pump 12 being indicated as connected to the whiskey condensate outlet 11 of the condenser. The degree of vacuum prevailing in the still will decrease from top to bottom in proportion to the resistance of the plates and their liquid baths; consequently, the boiling points of the beer on successive plates will increase from the top to the bottom of the column. It is understood that the boiling point of the liquid at the bottom of the column around sparge pipe 6a will always exceed that at the top due to the concentration of the more volatile materials at the top. The vacuum gradient, therefore, should be such that the highest beer boiling temperature in the column, i. e., the boiling point immediately adjacent the inlet of the heating medium through the sparge pipe, does not substantially exceed 187° F. and that the temperature to which any part of the beer is subjected at any time in the column, including the period of initial contact of the heating medium with the contents of the column in the bottom bath does not substantially exceed that temperature, since the increase in the "lightness" of the ultimate whiskey produced becomes noticeable at this temperature. Where possible, even lower boiling temperatures and lower maximum beer temperatures at all points including the point of introduction of the heating medium should be maintained since the beneficial results became more and more pronounced as such temperatures are reduced.

Prior to its introduction into the column, distiller's beer should be maintained at or exposed to a temperature not in excess of the predetermined boiling point in the column and is preferably fed into the column at a temperature corresponding to the predetermined boiling point of the beer in the column adjacent the point of the beer feed, that is to say, the temperature of the feed should approach, but not substantially exceed, the boiling temperature of the beer on the feed plate, which, if a maximum boiling point of 187° F. has been selected, will be somewhat lower than 187° F. or about 168° to 174° F., depending upon the temperature gradient in the column. Preferably, the feed temperature should be just slightly below the boiling point of the beer on the feed plate, but good results can be obtained even where the feed temperature is substantially below such boiling temperature.

The temperature of the entering steam, or other heating medium, is selected so that the temperature of the beer both initially and thereafter contacted by the heating medium in the column does not substantially exceed the maximum boiling point predetermined for the beer in the column by the vacuum that is selected. Therefore, the entering steam is usually desuperheated to bring about this result, the steam being desuperheated to a temperature whereby the temperature of the beer will not be raised substantially above 187° F. It is understood that the temperature of the steam or other heating medium, as initially introduced, may be necessarily slightly above the boiling point of the adjacent liquid to overcome radiation losses in the column. The difference in temperature will depend, of course, on the amount of radiation losses encountered in each particular column.

The neutral spirit distilling arrangement schematically shown in Figure 2, which includes three fractionating columns, comprises: a beer still 1, an aldehyde column 13 and a condenser 16; and a rectifying column 22 and a condenser 25. The beer still is constructed, arranged and operated to strip the beer in the same manner as the still in Figure 1 except that its vapor outlet 7 is connected to the aldehyde column 13 instead of to a condenser.

Aldehyde column 13 functions to fractionate vapors. It is of conventional character and, therefore, conventionally provided with: a bottom steam inlet 14 connected to suitable distributing means such as a sparge pipe; a top reflux circuit for drawing aldehyde vapors from the top of the column through vapor line 15 into condenser 16 and discharging the aldehyde condensates through line 17 into the reflux line 18 and the aldehyde drawoff line 19 leading to a suitable receiver; a central water feed line 20; and a bottom dilute alcohol line 21 which discharges through a suitable seal 21a into an intermediate portion of the rectifying column 22.

The rectifying column 22 functions to concentrate the dilute alcohol and remove impurities such as fusel oil. It likewise is of conventional character and, therefore, conventionally provided with: a bottom steam inlet 23 connected to a suitable distributing means such as a sparge pipe; a top reflux circuit for drawing neutral spirit vapors from the top of the column through vapor line 24 into condenser 25 and discharging the neutral spiriti condensate through line 26 into the reflux line 27 and the neutral spirit drawoff line 28 to a suitable receiver; a fusel oil drawoff line 29; and a water discharge line 30 having a suitable seal 30a therein.

In applying the invention to the arrangement shown in Figure 2, excellent results will be obtained simply by operating the beer still 1 under vacuum in the same manner as the column 1 of Figure 1. In that event, a vacuum pump can be applied to a vapor outlet line from a condenser (not shown in drawing) of the top of the beer still. However, results can be improved by additional placing of the aldehyde column under vacuum. Accordingly, the pump may be connected to the aldehyde condensate line 17 as indicated at 31 and thereby maintain both the beer still and aldehyde column under vacuum. A series arrangement of this character will, however, limit the degree of vacuum obtainable in the beer still. Hence, in some cases, it may be necessary to apply vacuum producing equipments directly to both columns.

A further improvement in the final product can be secured by also placing the rectifying column under vacuum. This may be done by connecting a vacuum pump 32 to the neutral spirits condensate discharge line 26. In all applications, the higher the vacuum, the better the results.

While the application and operation of my invention will be clear from the foregoing, it may be helpful to indicate operating conditions which have given good results in the production of neutral spirits where the vacuum was applied in one instance, only to the aldehyde column and beer still in series and in the other instance to the aldehyde column and beer still in series, and to the rectifying column, separately. In the following table, the column L1 applies to the former and R2 to the latter.

| Operating conditions | Plants | |
|---|---|---|
|  | L1 | R2 |
| Top vacuum in inches of mercury | 17½ | 22½ |
| Temperature of beer feed °F | 135 | 90 |
| Beer boiling temperature, initial stripping °F | 181 | 169.5 |
| Beer boiling temperature, feed plate °F | 168 | 144 |

Spirituous liquors contain congeners such as aldehydes, acids, esters, and fusel oil. While the absence of these constituents does not necessarily indicate a pure spirit, there being other contaminants, it seems reasonable to suppose that as the purity of the spirit increases, the congeners would decrease. Chemical analysis, however, discloses that a reduction of temperature in the beer still brings about a decrease in the acid and aldehyde content of the beer still vapors, the esters remaining the same. In the aldehyde column, the temperature reduction appears to have no noticeable effect on the congeners; yet the product is improved.

The term "beer" as used in this application is intended to include fermented materials (wine must, beer wort, whiskey mash or berry extract) from which spirituous liquors such as whiskey, neutral spirits, brandy and alcoholic distillates are made.

This application is a continuation-in-part of my application Serial No. 307,392 filed December 4, 1939.

Having described my invention, I claim:

1. An improvement in the art of continuously distilling spirituous liquors, which are definitely light in body and relatively free of impurities imparting objectionable taste and odor characteristics, comprising: continuously feeding a stream of distiller's beer into the upper portion of a fractionating column at a temperature not exceeding the (minimum) beer boiling temperature within the column adjacent the entrance of the beer feed; continuously introducing a beer boiling medium into the lower portion of the column at a temperature not exceeding the maximum beer boiling temperature within the column adjacent the entrance of the boiling medium beyond the slight extent required to overcome radiation losses in the column, the beer boiling medium operating as it passes upwardly thru the column to distill from the beer progressive fractions of its alcoholic content in the form of vapor leaving at the bottom of the column, a waste slop residue substantially free of alcohol; and continuously subjecting the beer within the column to sufficient vacuum to maintain said maximum beer boiling temperature at a value not substantially exceeding 187° F.

2. An improvement in the art of continuously distilling spirituous liquors, which are definitely light in body and relatively free of impurities imparting objectionable taste and odor characteristics, comprising: continuously feeding a stream of distiller's beer into the upper portion of a fractionating column at a temperature not exceeding the (minimum) beer boiling temperature within the column adjacent the entrance of the beer feed; continuously withdrawing a stream of slop which is substantially free of alcohol from the bottom of the column; continuously introducing a beer boiling medium into the lower portion of said column at a temperature not exceeding the maximum beer boiling temperature within the column adjacent the entrance of the boiling medium beyond the slight extent required to overcome radiation losses in the column, the beer boiling medium operating as it passes upwardly thru the column to distill from the beer progressive fractions of its alcoholic content in the form of vapor, thereby leaving a stream of slop substantially free of alcohol; continuously maintaining the beer as it flows downwardly thru the column under vacuum which progressively decreases from the upper beer entrance to the lower boiling medium entrance, and which at the lower entrance is sufficient to maintain said maximum beer boiling temperature at a value not substantially exceeding 187° F.; and continuously removing the beer distillate from the column.

3. The improvement defined in claim 2 wherein: the beer distillate is continuously fractionated under vacuum within an aldehyde column to produce dilute alcohol.

4. The improvement defined in claim 2 wherein: the beer distillate is continuously fractionated under vacuum within an aldehyde column to produce dilute alcohol; and the dilute alcohol is continuously concentrated under vacuum within a rectifying column to produce neutral spirits.

5. The improvement defined in claim 1 wherein: a bath of beer is continuously maintained at the bottom of the still; and the heating medium is introduced into the still by releasing it within said bottom bath.

HERMAN F. WILLKIE.